US008189998B2

(12) United States Patent
Bland

(10) Patent No.: US 8,189,998 B2
(45) Date of Patent: May 29, 2012

(54) APPARATUS FOR AND A METHOD OF COPY-PROTECTING A CONTENT CARRYING RECORDING MEDIUM

(75) Inventor: Timothy Neil Bland, Egham (GB)

(73) Assignee: Rovi Solutions Corporation, Santa Clara, CA (US)

( * ) Notice: Subject to any disclaimer, the term of this patent is extended or adjusted under 35 U.S.C. 154(b) by 1170 days.

(21) Appl. No.: 12/009,250

(22) Filed: Jan. 16, 2008

(65) Prior Publication Data

US 2009/0180756 A1 Jul. 16, 2009

(51) Int. Cl.
*H04N 9/80* (2006.01)

(52) U.S. Cl. ............... 386/252; 726/26; 380/201

(58) Field of Classification Search .................. None
See application file for complete search history.

(56) References Cited

U.S. PATENT DOCUMENTS

| 6,553,180 | B1 * | 4/2003 | Kikuchi et al. ............... 386/241 |
| 6,574,417 | B1 * | 6/2003 | Lin et al. ....................... 386/241 |
| 6,839,312 | B2 | 1/2005 | Heylen et al. |
| 7,062,686 | B2 | 6/2006 | Moritomo |
| 7,099,561 | B1 * | 8/2006 | Lin et al. ....................... 386/241 |
| 7,127,149 | B1 * | 10/2006 | Lin ................................ 386/329 |
| 7,606,463 | B2 * | 10/2009 | Seo et al. ....................... 386/248 |
| 2002/0076046 | A1 | 6/2002 | Heylen |
| 2003/0101140 | A1 | 5/2003 | So et al. |
| 2003/0190961 | A1 * | 10/2003 | Seidman ......................... 463/43 |
| 2004/0165861 | A1 * | 8/2004 | Seo et al. ....................... 386/68 |
| 2005/0019017 | A1 | 1/2005 | Green |
| 2005/0220439 | A1 * | 10/2005 | Carton et al. ................... 386/4 |
| 2006/0023600 | A1 * | 2/2006 | Selinfreund et al. ........ 369/53.21 |
| 2006/0253713 | A1 * | 11/2006 | Terranova et al. .............. 713/194 |
| 2006/0263056 | A1 * | 11/2006 | Lin et al. ....................... 386/95 |
| 2007/0036517 | A1 | 2/2007 | Ikeda et al. |
| 2007/0036527 | A1 | 2/2007 | Kim |
| 2007/0112710 | A1 * | 5/2007 | Drane et al. ................... 706/45 |
| 2007/0140667 | A1 | 6/2007 | Uchimura |

(Continued)

FOREIGN PATENT DOCUMENTS

KR 10-2004-0075242 A 8/2004

(Continued)

OTHER PUBLICATIONS

International Search Report for International application No. PCT/US2009/000175, mailed Aug. 3, 2009, 1 page.

*Primary Examiner* — Oscar Louie
(74) *Attorney, Agent, or Firm* — Morrison & Foerster LLP

(57) ABSTRACT

Recording data for an optical disc such as a DVD has video content data and navigation data. Button data defines one or more user-selectable selection buttons to enable a viewer to select content data when the recording medium is played. Further button data defines at least one phantom button that is not selectable by a viewer because, for example, it is not visually distinguishable, it is hidden within the video data or it is displayed for a short period of time. Although the at least one phantom button is not selectable by a viewer, a copying apparatus parsing the recording data will erroneously identify the phantom button as a user-selectable selection button and will copy data associated with the phantom button. The data associated with the phantom button may adversely affect the copying process or render the copy unplayable or unwatchable.

16 Claims, 10 Drawing Sheets

U.S. PATENT DOCUMENTS

| | | | |
|---|---|---|---|
| 2007/0165505 A1* | 7/2007 | Takeuchi | 369/53.24 |
| 2008/0219123 A1 | 9/2008 | Basile et al. | |
| 2008/0307451 A1* | 12/2008 | Green | 725/25 |

FOREIGN PATENT DOCUMENTS

| | | |
|---|---|---|
| WO | WO 00/74053 | 12/2000 |
| WO | WO 01/61695 | 8/2001 |
| WO | WO 01/61696 | 8/2001 |
| WO | WO 02/11136 | 2/2002 |
| WO | WO 2005/081245 A2 | 9/2005 |
| WO | WO 2008/005184 A2 | 1/2008 |

\* cited by examiner

APPARATUS FOR AND A METHOD OF COPY-PROTECTING A CONTENT CARRYING RECORDING MEDIUM

FIELD OF THE INVENTION

This invention relates to an apparatus for and a method of copy-protecting a content carrying recording medium against unauthorised copying of that content where the recording medium is an optical disc (or a precursor thereof) or other recording medium from which content data that can be accessed in a non-sequential manner using navigational data stored by the recording medium, to a recording medium having such copy protection and to copy-protected data for recordal on a recording medium. For simplicity, a recording medium from which content data that can be accessed in a non-sequential manner using navigational data stored by the recording medium is referred to hereinafter simply as a "recording medium".

BACKGROUND OF THE INVENTION

The advent of digital recording techniques has enabled digital copies of digital content carried by recording media such as optical discs (for example DVDs) to be made with little or no loss of copy quality. This makes it easy for an unauthorised person to produce unauthorised copies of digital content-carrying recording media. Accordingly, copy-protection techniques have been developed. Most current copy-protection techniques exploit differences in the ways a legitimate player and an unauthorised copying apparatus or "ripper" would access a recording medium in order to defeat copying while preserving good playability. As an example, a legitimate DVD player follows a navigational path on the DVD that is defined by navigation data carried by the DVD whereas most unauthorised copying apparatus or rippers access the content of a DVD file-by-file or sector-by-sector. Accordingly, production of good quality or playable copies by a file-by-file or sector-by-sector unauthorised copying apparatus can be frustrated by adding subversive data (that is data that detrimentally affects at least one of the copying process, copy quality and playability of a copy) to a part of the digital data that does not form part of the navigational path of the DVD so that the subversive data is ignored by a legitimate player but detrimentally affects the production of an unauthorised copy. As another possibility, data may be altered to affect the digital sum value (DSV) of some of the digital data in a manner which does not affect a legitimate player but interferes with an unauthorised copying apparatus or "ripper".

The above types of copy-protection may prevent digital copying of the content of an optical disc such as a DVD by a ripper that copies the data on a sector-by-sector or a file-by-file basis. However, other more sophisticated or intelligent rippers ("navigation-parsing" rippers) may be able to parse navigation information contained on the optical disc to determine the navigation path(s) that a player would follow when playing the optical disc and therefore may be able to copy the content data (for example a movie or film) whilst avoiding copying any subversive data because the subversive data is of necessity not placed on a navigation path.

SUMMARY OF THE INVENTION

An embodiment provides apparatus for providing, for recordal onto a recording medium, recording data having content data and control data for enabling a player playing such a recording medium to navigate through the content data, wherein the control data includes data representing or defining selection buttons to be displayed to a viewer when the recording medium is played to enable the viewer to select the content data to be played. In an embodiment, the control data includes data representing or defining at least one phantom button that cannot, or cannot easily, be accessed by a viewer playing the recording medium (for example the phantom button may not be visible to or may not be easily seen by a viewer when the recording medium is played or may not be recognised by the viewer as a selection button) but that will be identified as a selection button by a navigation-parsing ripper. Such a phantom button may be associated with subversive data that inhibits copying of the recording medium and/or adversely affects the quality or playability of a copy. This subversive data should not affect the playability of the original recording medium because the viewer controlling the player (via a remote control or other user input) should not be able to select the phantom button. However, a navigation-parsing ripper may not be able to distinguish between such a phantom button and a true selection button and so may select the phantom button and thus any associated subversive data for copying.

The at least one phantom button may form part of a phantom button menu that, when the optical disc is played, is displayed in a manner that does not allow a user the opportunity to select the phantom button. Such a phantom button menu may represent, for example, a completely blank or black screen on which the at least one button is not distinguishable from the background. Such a phantom button menu may be designed to be displayed for a very short period of time representing only a very small number of frames, for example about 0.4 seconds of video. The at least one phantom button may be hidden within the content or control data so as not to be visible to a user. For example, such a phantom button may constitute a region consisting of a number of pixels indistinguishable to the human eye from the rest of the frame or frames within which the phantom button is located. For example, the pixels forming a phantom button may match or be camouflaged within the visual content of the frame or frames in which they are placed. As another example, such a phantom button may comprise a thin region, for example a one pixel wide region, at one or more edges of a frame or frames of video. Such a thin pixel region may comprise black pixels to maximise the likelihood that it will not be noticed by a viewer.

In an embodiment, the at least one phantom button is associated with a subversive region or regions of the recording medium, which subversive region at least one of: inhibits copying of the recording medium; and adversely affects the quality or playability of a copy. In an embodiment, the at least one phantom button is associated with at least one of: scrambled or unreadable data; incorrect data; data that includes non-correctable errors; a damaged area of the recording medium.

In an embodiment, the navigation data comprises menu data comprising the button data for the one or more user-selectable selection buttons and the further button data for the at least one phantom button is provided in that menu data.

A video object unit comprising a phantom button may be placed anywhere within the content data, for example within a menu to be displayed to a viewer or within part of the actual video footage of a movie.

In an embodiment, recording data for an optical disc such as a DVD has video content data and navigation data. Button data defines one or more user-selectable selection buttons to enable a viewer to select content data when the recording medium is played. Further button data defines at least one phantom button that is not selectable by a viewer because, for example, it is not visually distinguishable, it is hidden within the video data or it is displayed for a short period of time. Although the at least one phantom button is not selectable by a viewer, a copying apparatus parsing the recording data will erroneously identify the phantom button as a user-selectable selection button and will copy data associated with the phantom button. The data associated with the phantom button may adversely affect the copying process or render the copy unplayable or unwatchable. The phantom button may be added to a menu of the navigation data or to part of the content data or provided within a phantom menu provided in a video clip that when played provides a black or blank screen for a short period of time, for example 0.4 seconds.

The at least one phantom button may comprise, for example: an indiscernible or indistinguishable button; a button of the same colour as a background of a video frame containing the phantom button; a button camouflaged in the video frame or frames within which it is present; a button that is visible for a period of time shorter than that within which a viewer would be able to act to select the button; a button having at least one dimension of only one or two pixels; a button that borders an edge or forms part of an edge of at least part of at least one video frame. If there is more than one phantom button then any one of any combination of these types of phantom button may be used.

The present invention also provides a method of inhibiting copying of content data by a navigation parsing riper by incorporating at least one of phantom buttons and phantom menus into the recording data.

The method may further comprise at least one of: providing a recording data file comprising the recording data; producing a master carrying the recording data; producing a precursor to a master carrying the recording data; producing at least one recorded medium such as an optical disc, for example a DVD carrying the recording data; and writing the recording data onto a writable or rewritable optical disc, for example a DVD.

The invention also provides the recording data itself and a recording medium carrying the recording data. The present invention also provides a computer-readable medium storing computer-readable instructions to program a processor to carry out the method.

The recording medium may be an optical disc such as a DVD or a precursor thereof such as Digital Linear Tape, glass master, or stamping master, or may be any other form of recording medium from which content data can be accessed in a non-sequential manner using navigational data stored by the recording medium.

BRIEF DESCRIPTION OF THE DRAWINGS

Embodiments of the present invention will now be described, by way of example, with reference to the accompanying drawings, in which.

DETAILED DESCRIPTION OF EMBODIMENTS

Figure 1:
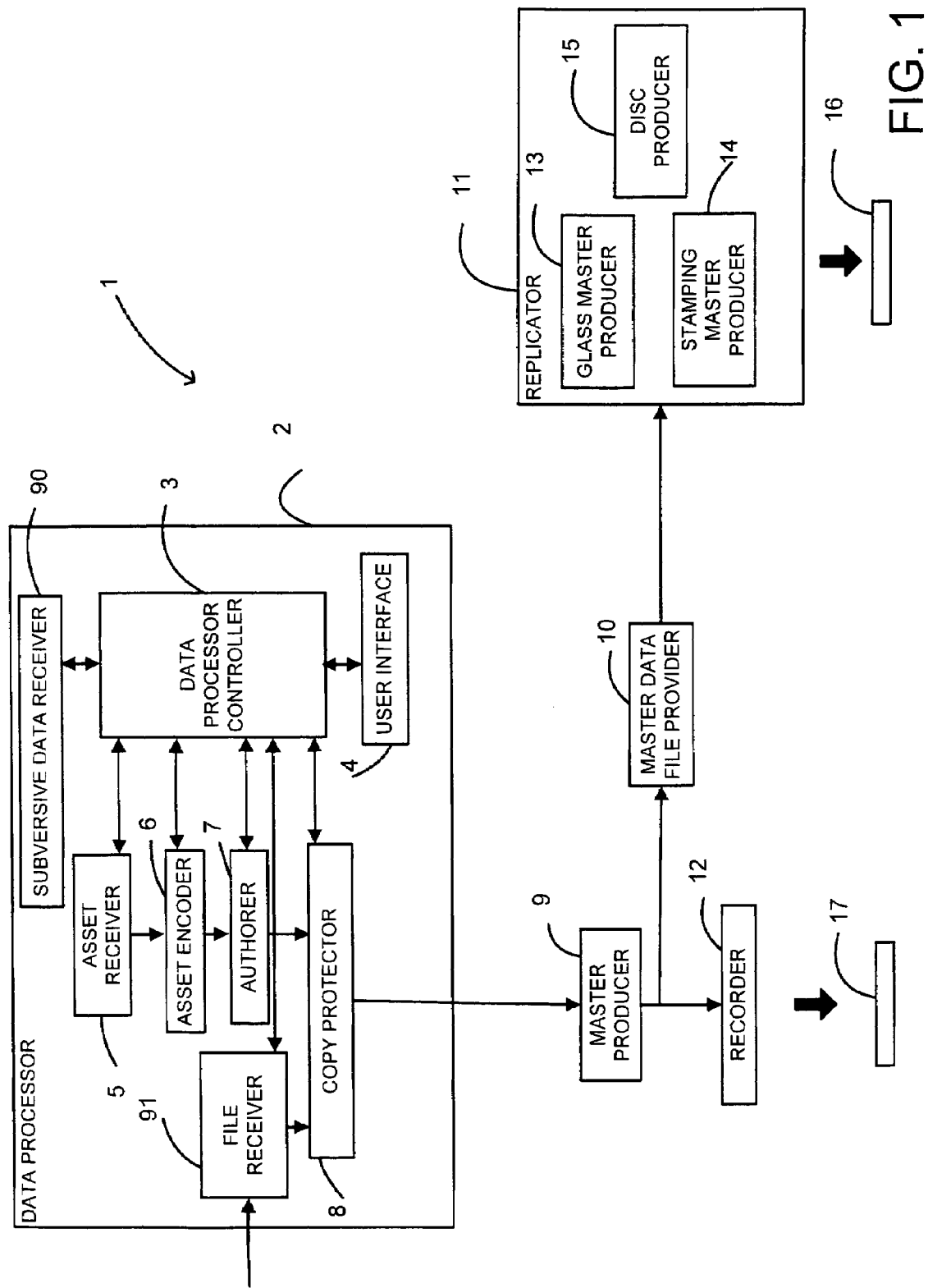
FIG. 1 shows a functional block diagram of producing apparatus for producing a copy-protected optical disc such as a DVD.

Referring now to FIG. 1, a producing apparatus 1 is operable, under user control, to provide recording data to be recorded onto an optical disc, in this case a Digital Versatile Video Disc (DVD-Video, abbreviated to DVD herein), wherein the recording data has video content data (for example a film or movie, a video game, an episode or episodes of a TV show and the like) and also navigation or control data for enabling a player playing such a recording medium to navigate through the content data and wherein the navigation data includes data representing or defining selection buttons to be displayed to a viewer when the recording medium is played to enable the viewer to select the content data to be played and where the recording data also includes data representing or defining at least one phantom button that will be identified as a selection button by a navigation-parsing ripper but will not be selected by a viewer when the recording medium is played because, for example the phantom button cannot, or cannot easily, be accessed by a viewer playing the recording medium, for example the phantom button may not be visible to or may not be easily seen by a viewer when the recording medium is played or may not be recognised by the viewer as a selection button. Such a phantom button may, for example, be part of a phantom menu or be incorporated in a true menu or in any part of the content data, or any combination of these where there is more than one phantom button. Such a phantom button may be associated with subversive data so that a ripper selecting a phantom button will copy the associated subversive data and the subversive data will detrimentally affect the copying process or the quality of the resultant copy.

The data processor 2 has a data processor controller 3 to control overall operation of the data processor 2, a user interface 4 operable to provide a user with information and to receive instructions from the user, an asset receiver 5 operable to receive assets (such as the video data file or data files plus any additional audio data files and graphics data files for logos, menus and the like) selected by the user to form the content of the DVD and an asset encoder 6, operable under the control of the controller 3 and in accordance with user instructions received via the user interface 4, to effect any required encoding of the assets to ensure that the assets are in a format specified by the DVD standard with which the DVD is to comply, for example MPEG 2 for video data.

The data processor also has an authorer 7 that enables the user, via the user interface 4, to specify parameters of the DVD being produced such as the video format and disc size, to import encoded assets from the asset encoder 6, to synchronise assets, and to add chapter points, create menus and so on, to ensure that the final DVD has the required presentation data (that is the audio and video content data to be delivered to a viewer by a DVD player) and navigation data (comprising general control data, search control data, user interface control data and navigation control data) to enable navigation through the content of the DVD in a non-sequential manner in accordance with the appropriate DVD standard. The authorer 7 thus, under user control, multiplexes the assets, adds navigation and control information according to the appropriate DVD standard specification and writes out an authored data file or final disc image or DDP (Disc Description Protocol) File Set containing the appropriate DVD specification data files in a directory. The authorer 7 is generally also able to simulate the resulting DVD so that the user can review and check their work.

The data processor 2 may also have a file receiver 91 to receive already authored DVD-Video content in the form of DVD-Video files, or as an image file or as a DDP File Set.

The data processor 2 may also include a subversive data receiver 90 operable to receive subversive data.

The data processor 2 also has a copy protector 8 to provide copy protection to a DVD-Video file, an image file or a DDP File Set provided by the authorer 7 or by the file receiver 91, as will be described below. Where authoring is to be carried out by the authorer 7, the functionality provided by the copy protector 8 may form part of the authorer so that the copy protection can be effected during the authoring process that results in the DDP File Set.

The data processor 2 is coupled to provide the copy-protected file to a master producer 9 configured to carry out a conventional mastering process including encoding the copy-protected image file or DPP File Set in accordance with the appropriate DVD standard specification to produce channel code data for recording, that is to carry out processes such as scrambling, interleaving, error correction and EFM plus encoding in accordance with the appropriate DVD standard specification.

The master producer 9 is arranged to provide the resulting master file to at least one of a local recorder 12 and a master data file provider 10, which in known manner provides a data file, for example a digital linear tape (DLT) file, for supply to a replicator 11. The replicator 11 will normally, although not necessarily, be located remotely of the remainder of the producing apparatus and will generally have a glass master producer 13 to cut a glass master, a stamping master producer 14 to produce from stamping masters the glass master and a disc producer 15 to produce the final DVD discs 16 from the stamping masters. Any local recorder 12 will be in the form of a DVD writer that writes or records on writable or rewritable DVD discs to produce one or more recorded discs 17. The master producer 9 is shown in FIG. 1 as a separate component but may be part of the data processor 2 or its functionality may possibly be provided by the recorder 12 and master data file provider 10.

Figure 2:
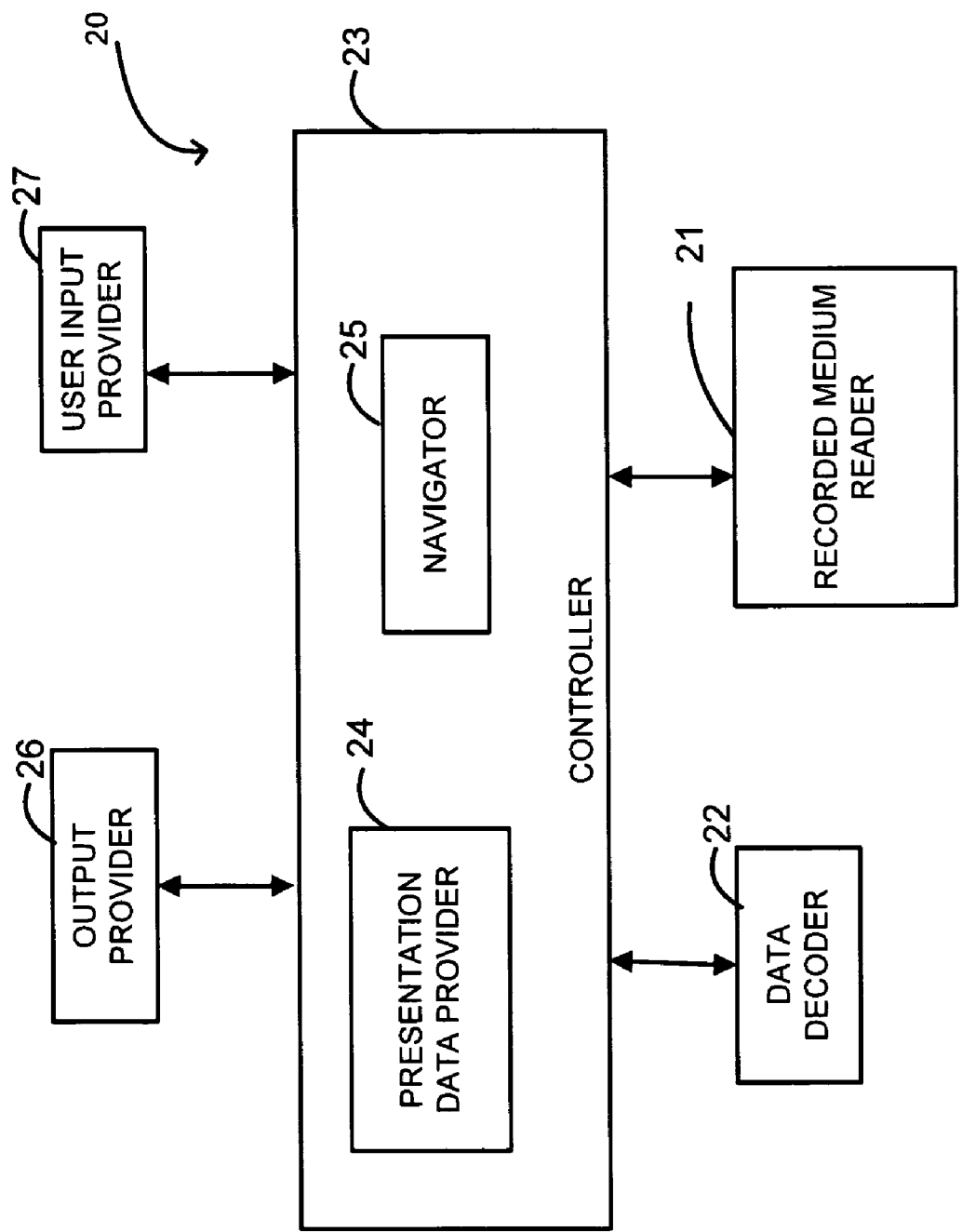
FIG. 2 shows a functional block diagram of reading apparatus for reading a copy-protected optical disc such as a DVD.

FIG. 2 shows a block diagram of a player 20 suitable for playing a copy-protected DVD produced by the apparatus shown in FIG. 1. The player 20 may be a dedicated DVD player or could be a personal or other computer having DVD playing capability. The player 20 has a recorded medium reader 21 with read head circuitry operable to read sectors of data from a recorded DVD and a data decoder 22 operable to decode channel data read by the read head circuitry. Although not shown in FIG. 2, the data decoder 22 may where appropriate have a clock extractor for extracting a clock signal, a de-interleaver or de-shuffler for de-shuffling sectors and a channel decoder for decoding the channel data.

The player 20 has a controller 23 which controls overall operation of the reading apparatus and which includes a presentation data provider 24 to provide presentation data to an output provider 26 which is generally in the form of an audio-video display system, for example a monitor and associated audio system or a TV display, but could be a communications link to an audio-video display system. The controller 23 also provides a navigator 25 to control the location on the DVD that is read by the read head circuitry of the recording medium reader 21 in accordance with user input instructions received via a user input provider 27 (which may be a keyboard, pointing device and/or a remote control, for example) and navigation or control data read from the DVD.

FIGS. 1 and 2 simply illustrate the provided functionality and should not be taken to imply that these functional components necessarily exist as discrete physical entities. Rather, the functionality may be provided by one or more physical components and, in the latter case, the functionality provided by a single functional component show in FIG. 1 or 2 may be distributed between different physical components. In addition, different aspects of the functionality may not be indentifiable as separate functionality.

The functional components shown in FIGS. 1 and 2 may, as appropriate, be provided by hardware, firmware, software or any combination of these.

Figure 3:
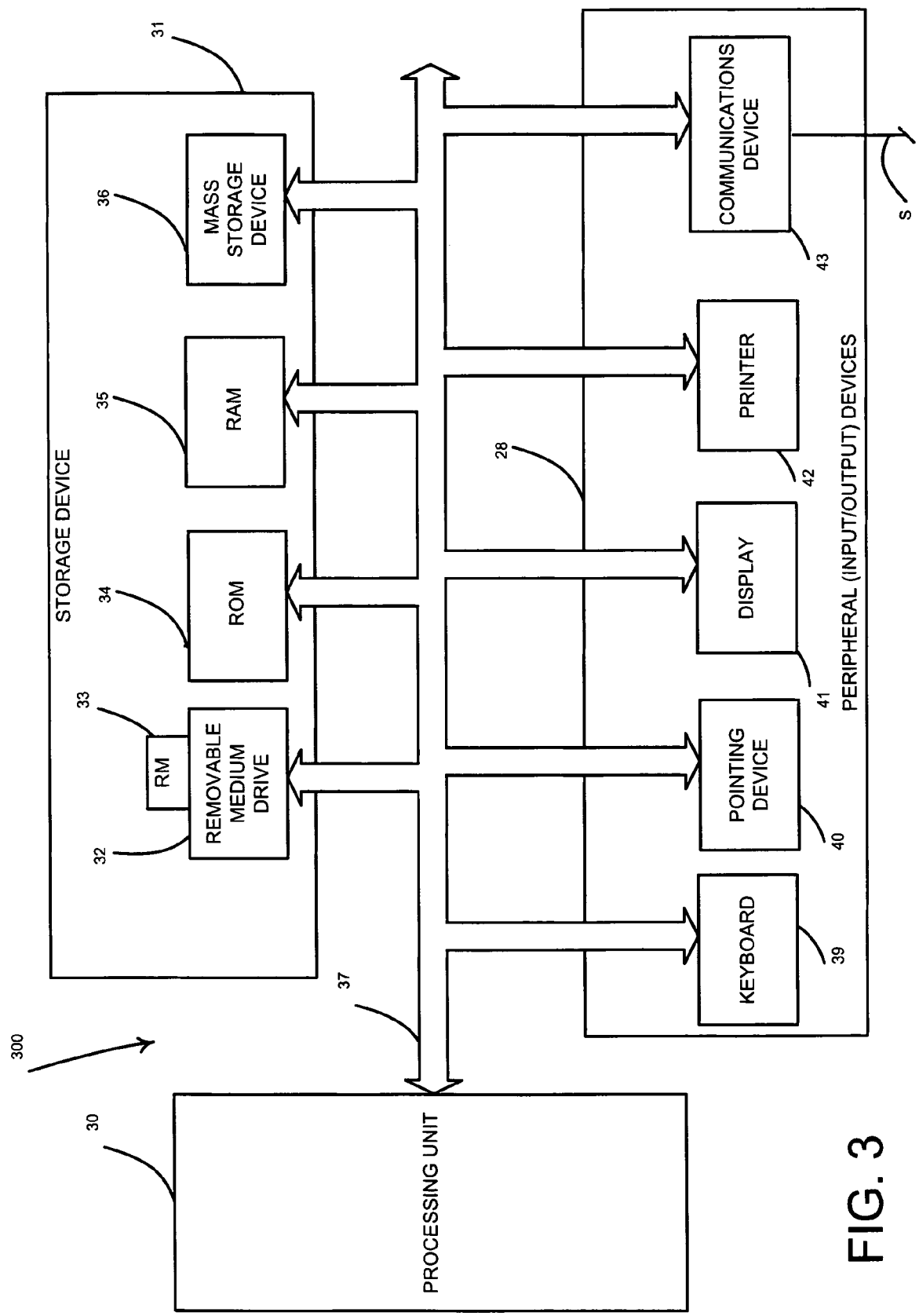
FIG. 3 shows a functional block diagram of computing apparatus that may be programmed to provide the copying apparatus shown in FIG. 1.

FIG. 3 shows a functional block diagram of computing apparatus 300 that may be programmed by program instructions to provide, for example, at least one of the data processor 2, master producer 9, recorder 12 and master data file provider 10 shown in FIG. 1 and/or the player 20 shown in FIG. 2.

The computing apparatus 300 comprises a processing unit 30 coupled by one or more buses 37 to storage devices 31 which comprise a removable medium drive or port 32 for receiving a removable medium RM 33 (in this case a DVD drive for receiving a DVD and/or a DLT drive), a read only memory (ROM) 34, a random access memory (RAM) 35 and a mass storage device 36 such as a hard disc drive.

The bus 37 also couples the processing unit 30 to a number of peripheral input/output devices that may form the user interface 20 of FIG. 1 and the output provider 26 and user input provider 27 of FIG. 2, in this case a keyboard 39, a pointing device 40 and a display 41. The peripheral devices may also include a communications device 43 to provide network communication and, optionally, a printer 42. The communications device 43 may be, for example, a MODEM, network card or the like for enabling the computing apparatus 300 to communicate over a network which may be the Internet but could alternatively or additionally be an intranet, a local area network, wide area network or any other suitable form of network.

It will, of course, be appreciated that the storage devices and input/output devices may not comprise all of those shown in FIG. 3 and/or could comprise additional devices. For example, one or more further removable medium drives or ports, such as a floppy disc drive, a Digital Linear Tape (DLT) drive and/or a USB port, may be provided and other or alternative input/output devices such as any one or more of a remote control, a microphone and a loudspeaker may be provided.

Figure 4:
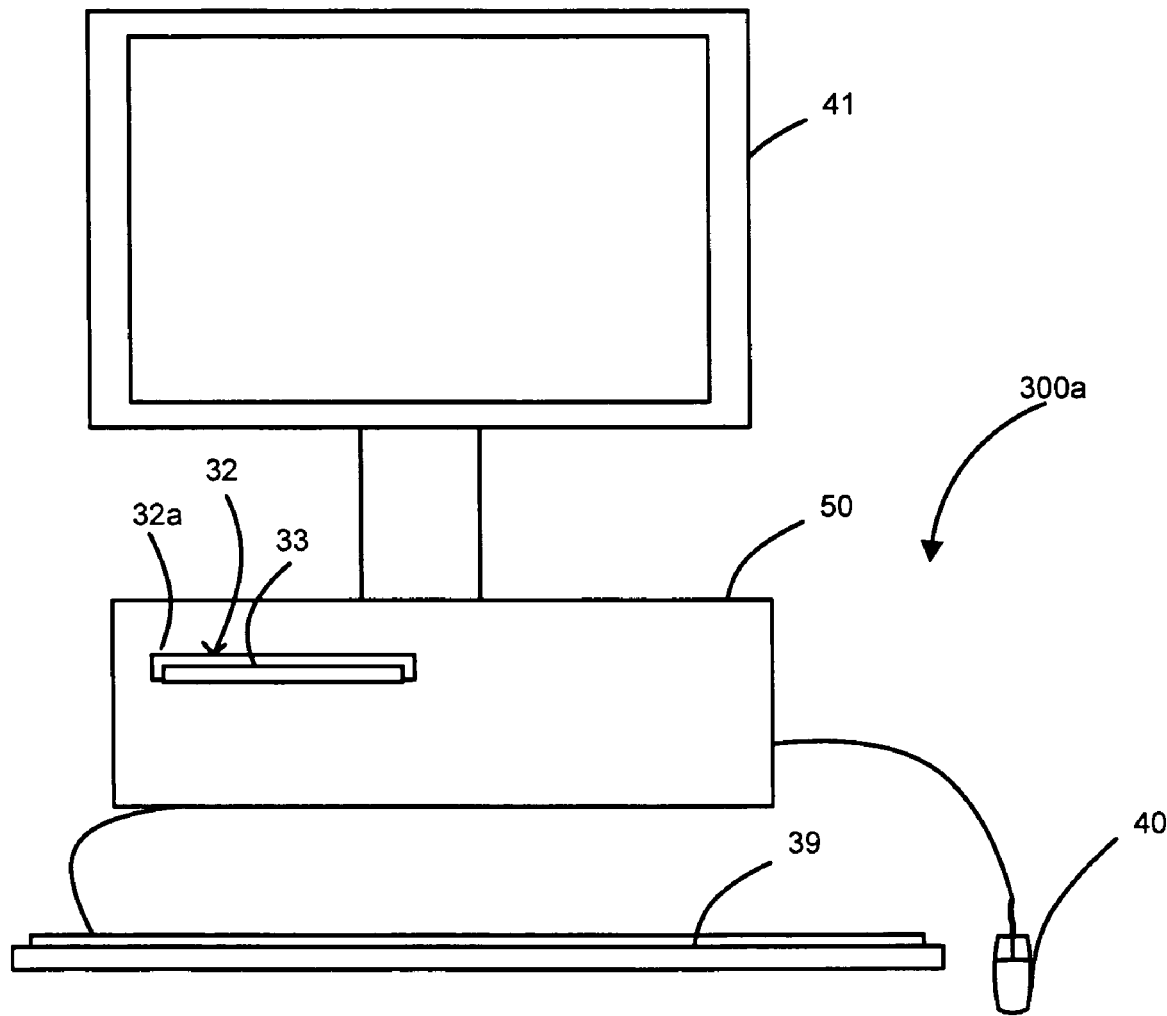
FIG. 4 shows a diagram illustrating an example of computing apparatus having the functionality shown in FIG. 3.

As shown diagrammatically in FIG. 4, the computing apparatus may be a personal computer or server 300*a* which has a main processor unit 50 containing the processing unit 30, storage devices 31 and user interface devices in the form, as shown, of a keyboard 39, mouse 40 and display 41. FIG. 3 shows a removable medium 33 extending from an insertion slot or port 32*a*.

The computing apparatus 300 or 300a may be programmed to provide the copying apparatus 1 shown in FIG. 1 by program instructions supplied by any one or more of the following routes:

pre-stored in the ROM 34 and/or or the mass storage device 36;

input by a user using an input device such as the keyboard 39 and/or the pointing device 40;

downloaded from a removable medium 33; and supplied as a signal S via the communications device 43.

Of course, where apparatus has different physical components, then these may be provided by programming of corresponding respective computing apparatus.

The apparatus shown in FIG. 1 enables a DVD to be produced that is difficult even for a navigation-parsing ripper to copy.

To facilitate understanding of how the apparatus 1 shown in FIG. 1 functions, the structure of a DVD first needs to be discussed.

A DVD has a complex and non-linear structure with multiple elementary streams being interleaved and multiple discrete elements of content being organized in a structured and hierarchical manner within a DVD-Video zone. Navigation to and through the digital presentation data stored on a DVD is controlled by navigation data which may be present at different levels in the physical data structure of the DVD-Video zone. The presentation data of a DVD-Video zone thus cannot be played simply by the player 20 accessing the recorded data in sequential manner from the beginning to the end of the recording of the data on the DVD. Rather, the navigation path or paths taken through the content by the player 20 depend(s) upon the navigator 25 of the player 20, the way the DVD is authored, and interaction with the user.

A DVD comprises a physical data structure and a logical data structure in the form of a logical hierarchy that overlies the physical data structure. The physical data structure determines the manner in which data is organised on a DVD with, in accordance with the DVD standards, data being stored in a sequential and physically contiguous or sequential manner on the DVD. The logical data structure determines the grouping of video sequences and the play back order of blocks of video in a sequence. The data to be recorded on the disc is organised in physical sectors. Each physical sector consists of a SYNC block, a header, a data pack and error detection code. In order to ensure that channel coding rules are met and to minimise the effect of defects on the disc, the data of these sectors have error correction parity codes added and are interleaved in blocks of 16 sectors (an ECC block) before channel coding in accordance with the EFM+ (8-to-16 modulation) channel coding scheme of the DVD format and the channel coded data is stored onto a DVD in the form of pits and lands. When recording the data, ISO/UDF file system information (in accordance with ISO9660/UDF (Universal Disc Format)) is recorded on the disc to enable location of and therefore access to each sector of the disc. The final data recorded on a single layer DVD consists of a lead-in section, then the program data section, and then a lead-out section.

Figure 5:
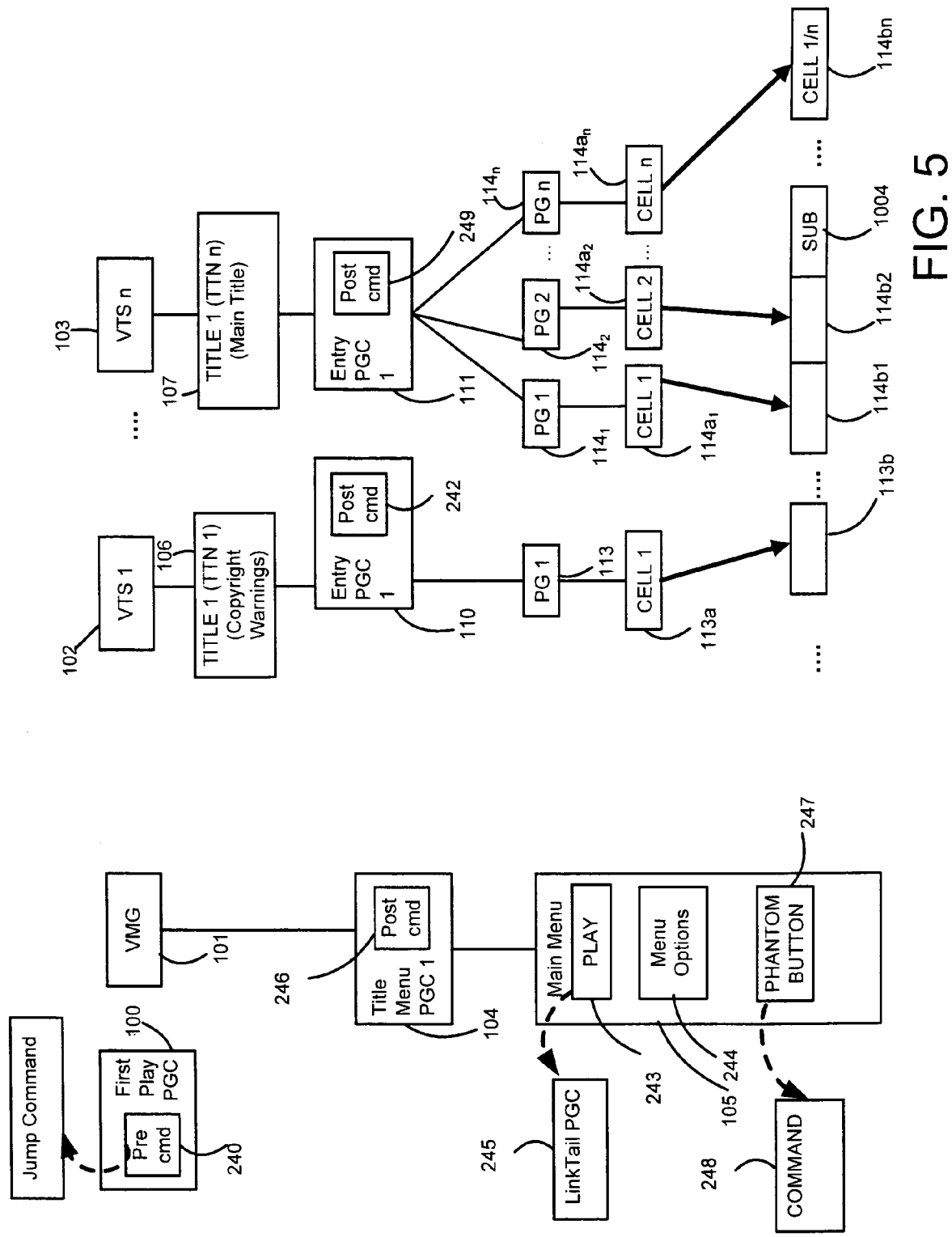
FIG. 5 shows a diagram for explaining the navigational and presentation data structure of an example of a DVD-Video protected according to an embodiment of the present invention.
Figure 6:
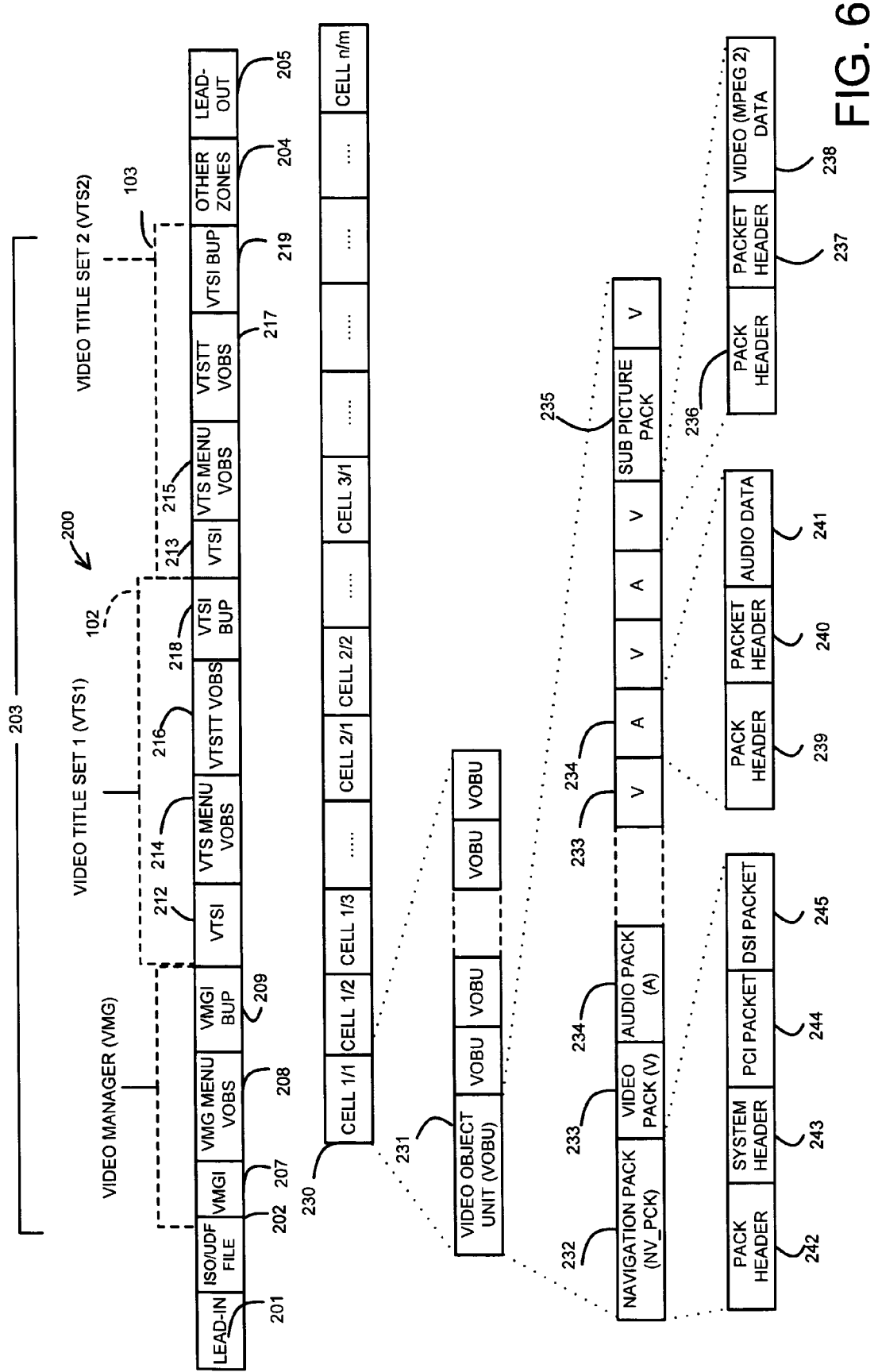
FIG. 6 shows a diagram for explaining the physical data structure of a DVD-Video.

FIG. 5 shows a diagram for explaining, by way of an illustrative example, the presentation and navigation data structure of one example of a DVD-Video protected according to the present invention while FIG. 6 shows a diagram for illustrating the structure of a protected DVD-Video zone.

As shown in FIG. 5, the navigation data structure comprises a first play program chain (PGC) 100 which is the first program chain to be executed when the disc is inserted into a DVD player, a video manager (VMG) 101 and video title sets (VTSs).

The video manager 101 provides control information for the entire DVD-Video zone. In the example shown in FIG. 5, the video manager 101 has a title menu program chain 104 which, as shown, corresponds to a main menu 105. Although for simplicity not shown in FIG. 5, the video manager 101 will generally also have one or more language folders.

The number of video title sets will depend upon the particular DVD structure. FIG. 5 shows two video title sets, a first video title set VTS1 102 for introductory data such as copyright warnings and the like and a second video title set VTS2 103 for the main content of the DVD (which content may be a film (movie), music video, or the like).

Each video title set will usually have a language folder and one or more title folders. The language folder is associated with one or more menu program chains (PGCs) for providing menus to be displayed to the user to enable the user to select various options such as language, cut, aspect ratio (widescreen or not) and so on, while the title folder is associated with at least one title program chain (a title may contain up to $2^{15}-1$ program chains). For simplicity, FIG. 5 shows only the title folders. In the example illustrated, the first video title set VTS1 102 has a single title folder 106 (Title 1 (TTN 1)) for copyright warnings while the second video title set VTS2 103 has a single title folder 107 (Title 1 (TTN2)).

Each title folder 106 and 107 has at least one program chain (PGC). The first program chain in a title is known as the entry program chain ("entry PGC"). As shown in FIG. 5, each title folder has a single program chain 110 and 111 and these therefore form the entry PGCs.

Each program chain comprises program chain information (PGCI) comprising navigation data which controls access to components of a program chain and contains from 0 to 99 programs (PG). A program chain may contain no programs but only PGCI. Such a program chain is known as a dummy program chain. For example, the first play program chain is a dummy program chain. The program chains may have pre-commands and post-commands that can be used to define the order in which the program chains are accessed by a player.

In the example shown in FIG. 5, a pre-command 240 of the first play PGC 100 causes a player to jump to the title 1 (TTN 1) title folder 106 and then to play the copyright warnings of the entry program chain 110 of first video title set 102. The entry program chain 110 has a post-command 242 to cause the player to jump to the title menu entry program chain 104 of the Video Manager.

As an illustration, FIG. 5 shows the program chain 110 as having a single program (PG 1) 113 and the program chain 111 as having n programs (PG 1 to PG n) $114_1$ to $114_n$.

Each program has one logical cell or a sequence of logical cells that map to a corresponding physical cell or physical cells of the presentation data structure. In the example of FIG. 5, each program 113 and $114_1$ to $114_n$ has a single logical cell 113a and $114a_1$ to $114a_n$. In the example shown, the logical cell 113a maps to a single physical cell 113b and each of the logical cells $114a_1$ to $114a_n$ maps to a corresponding physical cell $114b_1$ to $114b_n$.

It will of course be appreciated that FIG. 5 is a much simplified example and that a DVD may contain more video title sets and that a video title set may contain many more titles, program chains, programs and cells than are shown in FIG. 5. Also the mapping between logical and physical cells need not be one to one and the physical cells may well be ordered differently from the logical cells.

Normally the main menu 105 would consist only of selection buttons accessible by the user, for example a play button 243 and other menu option buttons 244 as shown in FIG. 5. In this example, however, the menu has been modified to add a phantom button 247. This phantom button 247 may be defined as, for example, a narrow (for example a one-pixel wide) region at the border of the video frame or frames containing the menu and the pixels of the phantom button may be defined to be black or otherwise dark so that a viewer does not recognise the phantom button 247 as a selection button and if he or she notices it at all merely considers it to be part of the border between the physical edge of the display screen and the video frame being displayed. As another possibility, the phantom button 247 may be camouflaged or hidden within the menu background.

In the example shown in FIG. 5, each true selection button (the play button 243 and other menu option buttons 244) is associated with a LinkTail PGC. LinkTail PGC 245 is shown in FIG. 5 for the play button 243 and is provided to cause, in response to selection of the play button 243 by a user of the player, the player to exit the main menu and then execute a post command 246 of the title menu entry program chain 104. For example, execution of the LinkTail PGC 245 will cause, via a Jump TT command in the post command area 246, the title x (which constitutes the main title in this example) to be played and a post command 249 of the title x entry program chain 110 will cause the player to return to the main menu after playing the title.

The phantom button 247 in FIG. 5 is associated with a command 248 that is associated with a subversive data location or region so that a navigation-parsing ripper which identifies the phantom button 247 as a selection button when it parses the navigation data of the recording medium will also copy or attempt to copy data from the subversive data location or region. The command 248 may be a LinkTail PGC, but most commonly would be a "Jump to Title" command (JumpTT TTN). The phantom button command should, of course, be different from any genuine button command so that a ripper is navigated to the subversive data location or region.

Data at the subversive data location or region or the process of attempting to copy data from that subversive data location or region will detrimentally affect the production of and/or playability of an unauthorised copy. As shown in FIG. 5, one or more physical cell or cells provide the subversive data location or region ("SUB") 1004. Such subversive cells will not form part of the navigational path of the DVD and so will not affect the ability of a legitimate player to play the DVD.

Such a subversive data location or region data may provide scrambled or unreadable data. As another possibility or additionally, such a subversive data location or region may inhibit unauthorised copying or at least render an unauthorised copy difficult to play or watch or of very bad quality. As an example, such a subversive data location or region may subvert the reading capabilities of a drive attempting to read that area. Examples of subversive data that may be used are described in, for example WO02/11136, WO00/74053, WO01/61695 and WO 01/61696, the whole contents of each of which are hereby incorporated by reference. Other possibilities may be to inject non-correctable errors in the EFM+ bitstream, to corrupt the digital sum value (DSV), or to deliberately damage areas of the glass master (and thus of the resultant DVDs) that do not form part of the navigation path in an attempt to make any copy DVD unplayable. These techniques may be used individually or in any combination.

The subversive data or region will detrimentally affect the copying process so that it may not actually be possible to produce a copy or any resulting copy will be rendered unwatchable or unplayable. The playability of the original recording medium will however not be affected by the subversive region because the viewer cannot see and so should not be able to select the phantom button which would lead the player to the subversive region.

Further phantom buttons may be provided in the main menu. As another possibility or additionally, a phantom button or phantom buttons may be provided in a language folder menu and/or a sub-menu of the content data. It may also be possible to hide phantom buttons with the actual content data, in addition to or in place of hiding them in menus. The different phantom buttons may point to the same subversive region or location or to one or more different subversive regions or locations.

FIG. 6 shows how a structure such as the one shown in FIG. 5 may be laid out on a DVD Volume 200. The DVD volume layout 200 has a lead-in 201 followed by ISO/UDF file system information 202, a DVD-Video zone 203, possibly one or more other zones 204, and finally a lead-out 205. The DVD-Video zone 203 has a video manager (VMG) 206 and one or more video title sets 102 and 103, as shown. The video manager (VMG) 206 consists of video manager information (VMGI) 207 comprising navigation data for the entire DVD-Video zone in a single file identified as VIDEO_TS.IFO, a video manager menu video object set (VMGM_VOBS) 208 provided as a single file identified as VIDEO_TS.VOB, and a back up file of the video manager information (VMGI_BUP) 209 in a single file VIDEO_TS.BUP. The video manager menu video object set 208 usually includes the presentation data for the title menu and any other non-dummy menu program chains.

Each video title set (VTS) consists of video title set information (VTSI) 212, 213 comprising navigation data to control the presentation of titles and menus in the video title set in a single file VTS_##_0.IFO (where ## represents a two digit number between 01 and 99 representing the video title set number), a menu video object set 214, 215 for any video title set menu video objects (VTSM_VOBS) which typically contains the content for all types of menu within the video title set in a single file VTS_##_0.VOB (as in the example shown in FIG. 5 there may be no menus within the video title set and so no VTS MENU VOBS), a video title object set (VTSTT_VOBS) 216, 217 for the video title set in one or more files identified as VTS_##_@.VOB (where @ is single digit number between 1 and 9) and a back up of the video title set information (VTSI_BUP) 218, 219 in a single file identified as VTS_##_0.BUP.

Each video object set (VOBS) consists of a sequence of physical cells. For clarity in the diagram, FIG. 6 shows part of a physical cell set (CELL 1/1 to CELL n/m) which may be part of the physical cell set of the VMG menu VOBS 208, the VTS MENU VOBS 214, the VTSTT VOBS 216, the VTS MENU VOBS 215 or the VTSTT VOBS 217. Each physical cell consists of one or more video object units (VOBUs) which each represent approximately 0.4 to one second of playback time (that is a number of consecutive frames). For simplicity in FIG. 6, the structure of only one physical cell 230 and one video object unit (VOBU) 231 of that physical cell 230 is shown.

As shown in FIG. 6, each video object unit consists of a navigation pack (NV_PCK) 232 followed by an integer number of video (V), audio (A) and sub-picture (S) packs 233, 234 and 235. On a DVD, each pack occupies one sector of user data on the disc (2048 bytes). Each video pack 233 consists of a pack header 236 identifying the pack followed by a packet header 237 identifying the packets within the pack and then the video data 238 in accordance with the DVD format, that is MPEG2 format. Similarly, each audio pack consists of a pack header 239 identifying the pack followed by a packet header 240 identifying the packets within the pack and the audio data 241 which may be in any format appropriate for DVD, for example MPEG, DTS, DD, LPCM, AC3.

Each navigation pack (NV_PCK) 232 consists of a pack header 242 identifying the pack, followed by a system header 243 and two navigation data packets 244 and 245. The first of the two packets 244 comprises presentation control information (PCI) for controlling control menu display and program presentation in real time and the second packet 245 comprises data search information (DSI) for controlling forward/reverse scanning and seamless branching. DVD players contain a track buffer to enable variable rate and seamless playback. There is therefore a time delay between reading by the read head and decoding and playing of the audio and video data. Therefore real time control information is distributed between and stored within the PCI and DSI packets and the player checks and utilises this information before and after the corresponding physical cell passes through the track buffer. Navigation packs 232 are thus used by the navigation engine or navigator 25 of the DVD player to ensure playback, trick play modes and search operations are executed successfully and in a timely manner.

It will be understood from the above that the DVD-Video zone thus includes navigation data that controls access and interactive playback and that navigation data exists at different levels within the DVD-Video zone. The navigation data includes control commands (for example for format, language, audio selection, sub-picture selection, parental management, display mode and display aspect), navigation commands (for example for general system parameters, system parameters, navigation timer and menu buttons), and search and user interface commands (for example for PGCI searches to enable selection of a particular menu or presentation data searches enable selection of a title, part of title (chapter), and so on).

The presentation control information (PCI) of a VOBU contains the data that defines the selection buttons of the VOBU, for example position co-ordinates, size, button colour, button highlight colour, button command, automatic activation for a particular button (such as a play button) if the user does not select a button within a set time limit, and so on.

Any required phantom buttons are defined using the presentation control information (PCI) for the corresponding VOBU. For example as discussed above, the size, position on the display screen, button colour, and button highlight colour for a phantom button may be defined in the presentation control information (PCI) for the corresponding VOBU so that, for example, the phantom button is presented as a narrow (for example one-pixel high, or one pixel wide) region at the border of the video frame and the pixels of the phantom button defined to be black or otherwise dark in colour, whether highlighted or not, or the phantom button is presented so as to merge with or be camouflaged in the menu background, for example the phantom button may be the same colour, whether highlighted or not, as the part of the menu within which it is located.

The explanation above of the DVD format is of necessity simplified. For a more detailed description of the DVD format and recording process, reference should be made to the publicly available DVD standards.

As described above, a phantom button may be added to an existing menu. As another possibility, an entire phantom menu with one or more phantom buttons may be added to the DVD-video by providing a VOBU with a sub picture pack for the phantom menu and defining appropriate phantom buttons in the navigation data for that VOBU so that, for example, the phantom menu is defined to be displayed for only a short period of time (for example 0.4 seconds), is dark, for example black or blank, and the phantom button or phantom buttons are of the same colour as the phantom menu, whether highlighted or not.

As another possibility, one or more "clones" of the actual video title may be created by the copy protector so that as described in U.S. application Ser. No. 11/481,605, the whole contents of which are hereby incorporated by reference, each of these "cloned" video titles is associated with the physical cells of the actual title but in a scrambled or incorrect order and/or with incorrect and/or with subversive data. Phantom buttons may then be associated with each of the video title clones so that a navigation-parsing ripper that identifies such a phantom button as a selection button will attempt to copy or will actually copy the data associated with the "cloned" video title which will adversely affect at least one of the copying process and any resultant copy. The phantom buttons may be hidden within a true menu or may be part of a phantom menu added to the DVD-video.

Figure 7:
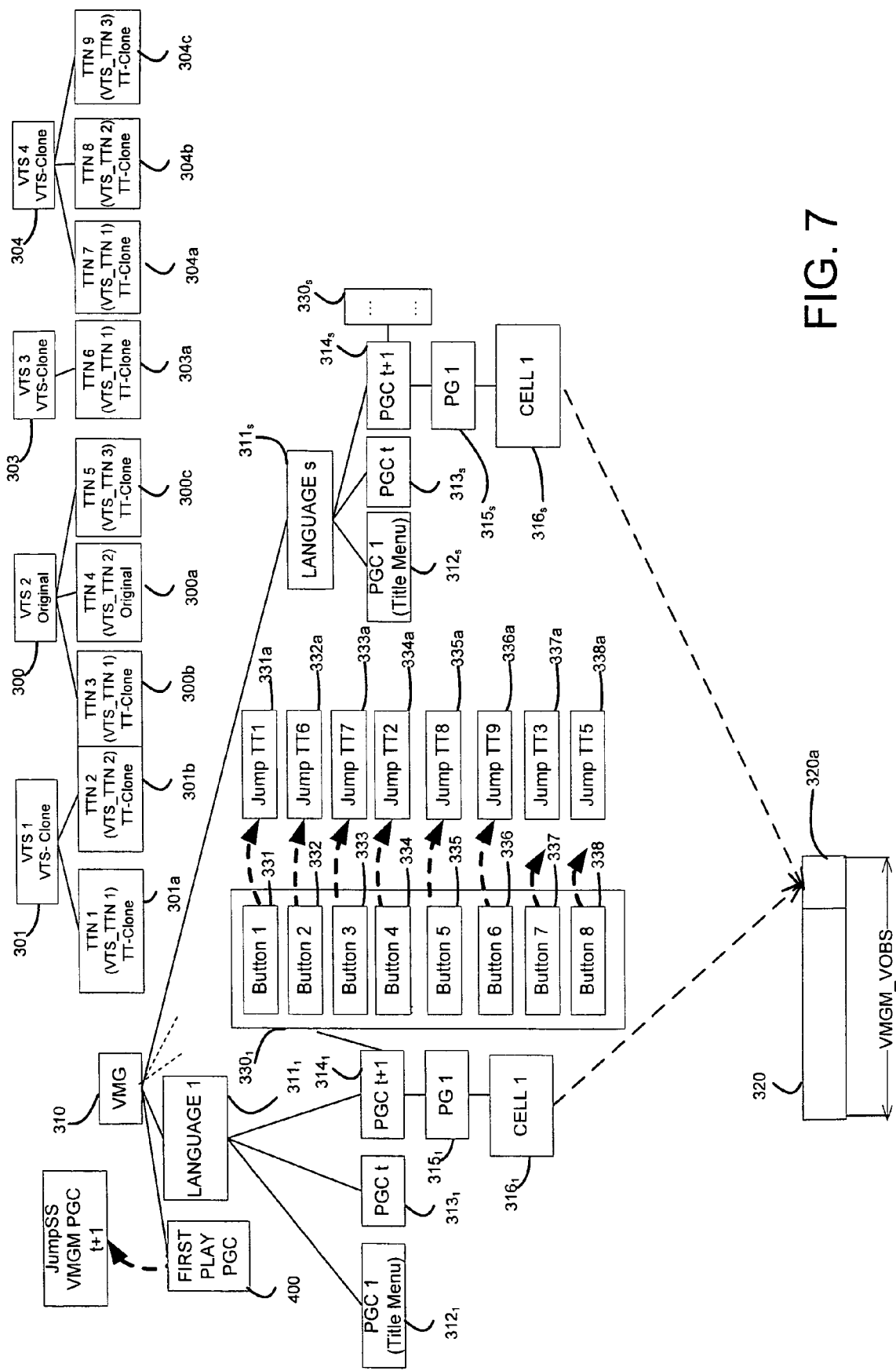
FIG. 7 shows a diagram for explaining the navigational and presentation data structure of an example of a DVD-Video protected according to an embodiment of the present invention.

FIG. 7 shows a diagram for illustrating one example of a DVD-video in accordance with the invention where the title for the original video title set VTS 2 original 300 has been "cloned" to provide, in the example shown, the original title set VTS 2 original 300 with two clone titles (TTN 3 and TTN 5) 300b and 300c in addition to the original title 300a and to provide three "clone" video title sets VTS 1 VTS-clone, VTS 3 VTS-clone and VTS 4 VTS-clone original 301, 303 and 304. As shown in FIG. 7, the clone video title set VTS 1 VTS-clone 301 has two cloned titles (TTN 1 and TTN 2) 301a and 301b, the clone video title set VTS 3 VTS-clone 303 has one cloned title (TTN 6) 303a and the clone video title set VTS 4 VTS-clone 304 has three cloned titles (TTN 7, TTN 8 and TTN 9) 304a, 304b and 304c. It will of course be appreciated that FIG. 7 is only an example and that the number of cloned video title sets and cloned titles may be greater or fewer than shown. Also, there may only be a single video title set containing both the original and the cloned titles.

In the example shown in FIG. 7, the Video Manager VMG 310 has a number of language folders $311_1$ to $311_s$ for languages 1 to s and each of these language folders is associated with a program chain (PGC 1) $312_1$ to $312_s$ for the title menu, possibly one or more further program chains (PGC t) $313_1$ to $313_s$ for other menus, and a program chain (PGC t+1) $314_1$ to $314_s$ for a phantom menu (only folders $311_1$ and $311_s$ and their associated program chains being shown). Although a number of language folders are shown in FIG. 7, there may or may not be more than one language folder, depending on the requirements for the DVD. In the example illustrated in FIG. 7, the program chains (PGC t+1) for the phantom menus $314_1$ to $314_s$ each have a single program group $315_1$ to $315_s$ and a single logical cell $316_1$ to $316_s$, although there could be more program groups and/or cells. For simplicity in FIG. 7, the program group chains for the video title sets and the program groups for the other program group chains of the language folders are not shown.

The program chains (PGC t+1) for the phantom menus $314_1$ to $314_s$ may each be associated with the same VOB 320a in the VMGM VOBS 320. The program chains may be configured to navigate a player to separate areas on the disc depending on the language. The Language Units may share the same physical cell in the VOB 320a.

Each of the phantom menu program chains (PGC t+1) $314_1$ to $314_s$ provides the corresponding language version of a phantom menu (shown only for program chains (PGC t+1) $314_1$) $330_1$ having a number of phantom buttons 331 to 338 equal to the number of cloned titles (eight in the example shown), with the proviso that the DVD standards allow a up to a maximum of 36 buttons per menu. Each of the phantom buttons is associated with a command that will cause a ripper selecting that phantom button to jump to a corresponding one of the cloned titles as illustrated in FIG. 7. The commands may be JumpTTx commands (where x is the number of the title to be jumped to), for example Jump TT1, Jump TT6, Jump TT7, Jump TT2, Jump TT8, Jump TT9, Jump TT3, Jump TT5 331*a* to 338*a* as shown in FIG. 7 or may be LinkTail PGC commands or any other navigation command allowed (by the DVD Specifications) to be associated with a button.

In the example shown in FIG. 7, the first play PGC 400 causes a player or ripper to jump to the phantom menu program chain PGC t+1 for the selected language, for example program chain PGC t+1 314$_1$. In this example, the phantom menu is designed so as to be a short silent video clip that is, by virtue of the first play PGC, displayed before the original main menu is presented to the viewer. Generally this video clip will present an all black screen, although other colours could be used. The phantom buttons are visually indiscernible or difficult to see or spot, for example a phantom button may be the same colour as the menu (black in this example) and so will be invisible to the viewer. The phantom menu is designed to appear on screen for only a short time, for example only 0.4 seconds, after which a post command copied from the command table of the First Play PGC will be executed, taking the player to where it was originally intended to go, for example this post-command may cause a player to jump to the original main menu from which a viewer can make a selection as normal. The display time for the all-black phantom menu and its buttons is so short that it will make little or no impression on the viewer who will not (because the phantom buttons are black on a black background) be aware of the phantom buttons and will therefore not try to select one. However, the length of time that the buttons are actually presented on screen is not a consideration for a navigation-parsing ripper which will thus select the titles referenced by the phantom buttons as a 'vital' part of the rip.

Although the cloned titles look, as far as the DVD-video structure and navigation data is concerned, like the original video title, the physical cells of the cloned titles will detrimentally affect the production of a copy by a ripper and/or will cause the resulting copy to be unwatchable and/or unplayable. For example, the cloned titles may at least one of: point to the correct physical cells in an incorrect or scrambled order; point to physical cells containing incorrect data; point to physical cells having subversive properties, for example containing any of the forms of subversive data discussed above. Some subversive properties, for example regions with altered digital sum values, may defeat the ripper entirely or slow it down so dramatically that the user of the ripper will terminate the rip.

As described above with reference to FIG. 7, the phantom button or buttons may be of the same colour as the background, may blend in or be camouflaged in the frame or frames in which they are present or may otherwise be rendered inconspicuous, for example as discussed above may be defined as a border region around the edge of the displayed frame. Also, it is possible to add a phantom button or buttons to any existing menu program chain, that is to add them to a true or actual menu, so that creation of a phantom menu is not necessary. As another possibility, the program chain to which a phantom button is added need not necessarily originally have any VOBs associated with it (that is the program chain may, as discussed above, originally be a dummy program chain that simply contains a Program Chain. Information table (PGCI)), that is the program chain may only have a phantom button VOB.

A phantom button may be added to any physical cell which is presented before, during or after the assets of the recording data by defining the phantom button in the PCI packet (see FIG. 6), specifically in the Highlight Information table within the PCI part of the Nav Pack. Such a phantom button may as described above be linked to any subversive region or location, for example a corrupt or subversive title or program chain that, for example, points to the correct physical cells in an incorrect or scrambled order; points to physical cells containing incorrect data; points to physical cells having subversive properties, for example containing any of the forms of subversive data discussed above, such that a ripper is forced to follow an incorrect path leading to termination of the ripping process or is caused to produce of an unwatchable or unplayable copy.

Figure 8:
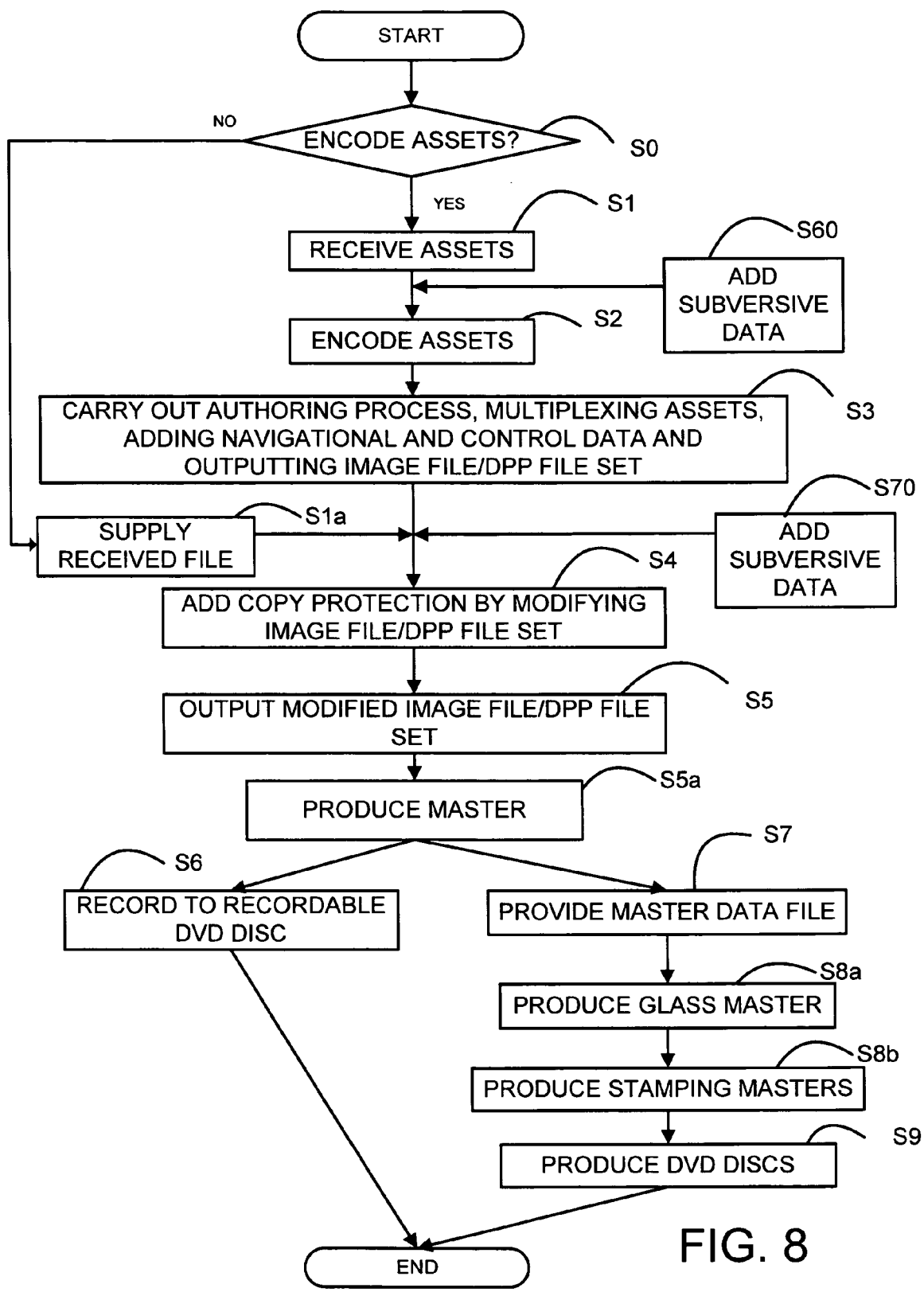
FIGS. 8 and 9 show a flow chart and a diagram, respectively, for explaining operations carried out by the apparatus shown in FIG. 1.
Figure 9:
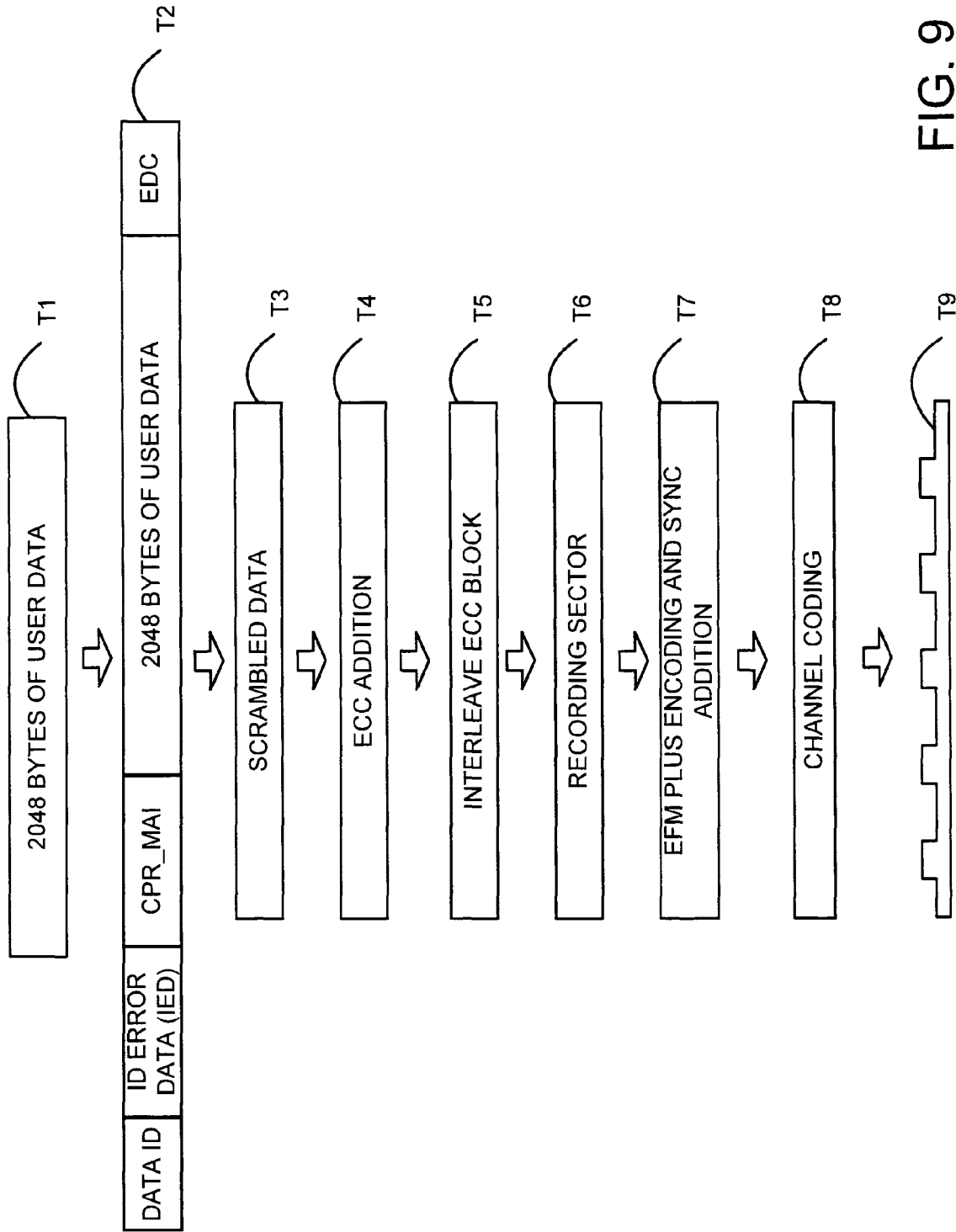

FIGS. 8 and 9 show a flow chart and a diagram, respectively, for explaining operations carried out by the apparatus shown in FIG. 1 during production of a DVD-Video zone.

When a user instructs the data processor 2 via the user interface 4 that a DVD-Video zone is to be produced, the controller 3 first determines, for example on the basis of user input, at SO whether assets are to be encoded or whether the file to be processed is an image file or DDP File Set received by the file receiver 91. If assets are to be encoded, then the controller 3 will generally prompt the user via the user interface 4 to provide the required assets which are then received by the asset receiver 5 at S1 in FIG. 8. The controller 3 may then prompt the user via the user interface 4 to check that the assets are in the correct data format (for example MPEG 2 for video) and, if not, to instruct the controller 3 to activate the asset encoder 6 to effect the necessary encoding at S2.

The controller 3 then at S3 in FIG. 8 controls the authorer 7, under user instructions via the user interface 4, to carry out an authoring process in which the user assembles the assets in the manner he or she desires with user-defined chapters and menus and a user-defined navigation path or paths through the content data and the authorer 7 multiplexes the user selected and organised assets and adds navigational and control data in compliance with the user's instructions and provides a image file or VIDEO_TS directory containing the VOB, IFO, BUP files to the copy protector 8 to produce an image file or DDP File Set.

If the answer at SO is no, then at S1*a*, the controller 3 causes a received image file or DPP File Set to be supplied to the copy protector 8.

At S4, the copy protector 8 adds copy protection to the image file/DDP File Set. At S5, the copy protector outputs the modified image file or DDP File Set to the master producer 9. At S5*a*, the master producer 9 carries out a conventional mastering process, including the normal processes of encoding the copy-protected image file or DPP File Set in accordance with the appropriate DVD standard specification and so produces channel code data for recording as illustrated schematically by FIG. 9. Thus, the master producer 9 carries out, on each sector of user data (T1 in FIG. 9), processes such as scrambling, ECC (Error Correction Code) addition, interleaving and recording sector product code generation (T3, T4, T5 and T6 in FIG. 9), EFM plus encoding (T7 in FIG. 9) in accordance with the appropriate DVD standard specification and channel coding (T8 in FIG. 9) to provide an authored file (DPP File Set).

The master producer 9 produces a master file, for example a digital linear tape, containing the copy-protected authored file (DPP File Set) for supply via the master data file provider 10 to the replicator 11 which may be remotely located. As another possibility, the master file may be supplied to the replicator over a network which may be a local network or the Internet, for example. The replicator 11 produces a glass master carrying the image file and physical sector address tags mapping the logical sector numbers to the actual sectors on the glass master. This glass master is then used at to produce stamping masters from which the final DVD discs are produced (T9 in FIG. 9).

As another possbility or additionally, the master file may be supplied at S6 to the local recorder 12 which records the image file onto a writable DVD disc and adds physical sector address tags to the actual sectors on the optical disc.

Subversive data may, depending upon the type of subversive data, be added at S60 prior to encoding of the assets, or at S70 prior to the copy protection process, or at S4 as part of the copy protection process, depending upon the type of subversive data. As another possibility, subversive data may be provided by deliberately physically damaging a sector or sectors of the disc during the final recording process by the recorder 12 or during production of the glass master, for example.

Examples of the operation of the copy protector 8 at S4 in FIG. 8 will now be described with the aid of FIG. 10.

Figure 10:
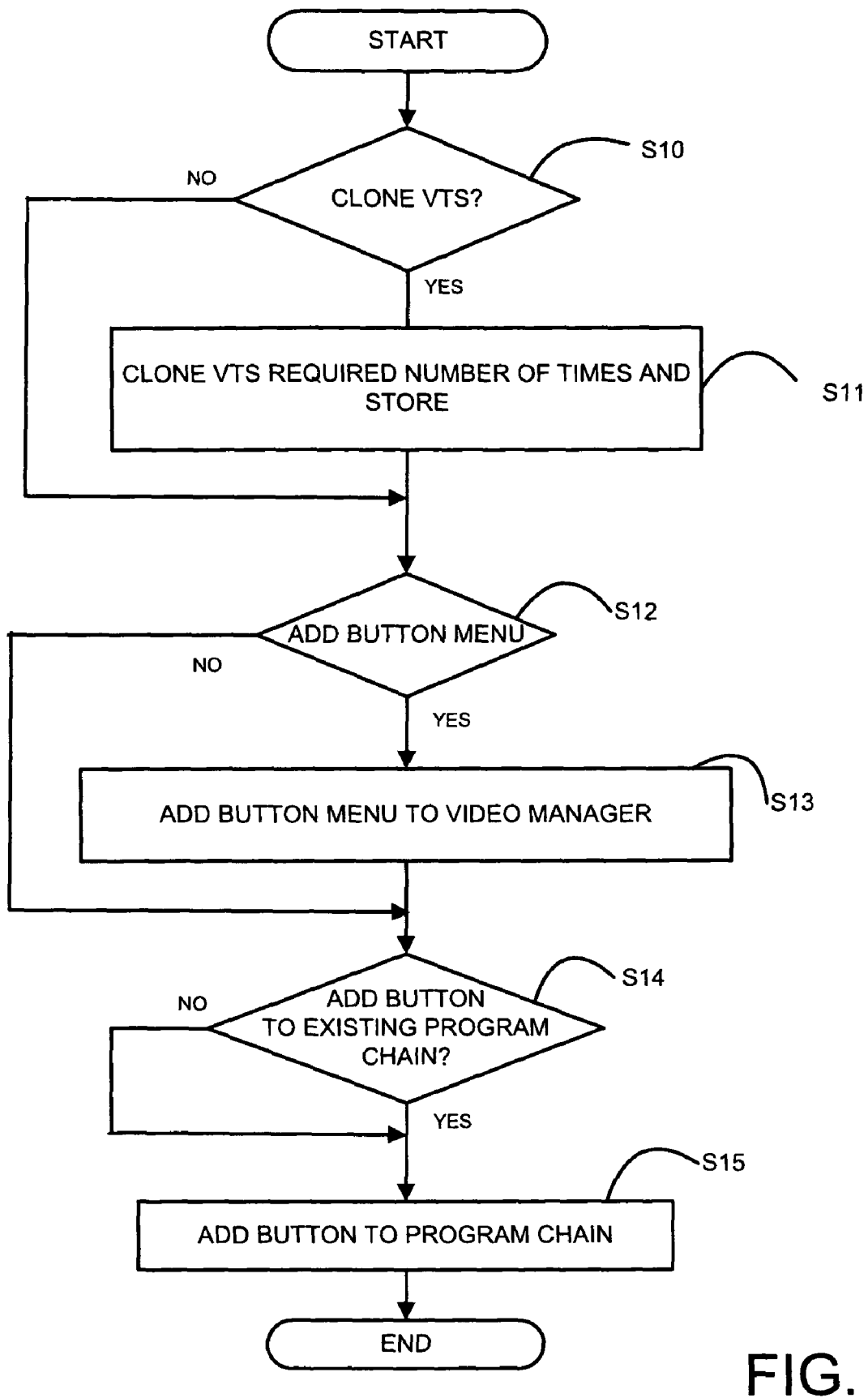
FIG. 10 shows a flow chart for illustrating operations carried out in a method in accordance with the invention to provide copy protection.

At S10 in FIG. 10, the copy protector determines whether a VTS is to be cloned as discussed above with reference to FIG. 7. This decision may, for example, be made by the copy protector in accordance with pre-stored instructions or may be in response to user instructions input by the user using the user interface 4.

If the answer at S10 is yes, then at S11 in FIG. 10, the copy protector clones the VTS and its title the required number of times, for example to produce the structure shown in FIG. 7, and saves or stores the thus-modified recording data.

At S12, the copy protector determines whether a phantom button menu is to be added. This determination may, for example, be made by the copy protector in accordance with pre-stored instructions or may be in response to user instructions input by the user using the user interface 4.

If the answer at S12 is yes, then at S13 the copy protector adds a phantom menu to the recording data in accordance with pre-stored instructions or in response to user instructions input by the user using the user interface 4. This phantom menu may be provided in the language folder(s) as discussed above with reference to FIG. 7 or may be provided elsewhere within the recording data.

If the answer at S13 is no, then the copy protector determines at S14 whether a phantom button is to be added to an existing program chain. This determination may, for example, be made by the copy protector in accordance with pre-stored instructions or may be in response to user instructions input by the user using the user interface 4. If the answer is yes, then the copy protector adds the phantom button or buttons in accordance with pre-stored instructions or in response to user instructions input by the user using the user interface 4. As discussed above with reference to FIG. 5, the copy protector may, for example, add a phantom button or buttons to an actual or true menu, for example a phantom button may be defined as a thin strip or region of pixels at the border of a frame or menu. The pixels defining a phantom button may be defined to be black or dark in colour or to merge with or be camouflaged within the menu to which they are being added. As another possibility, a phantom button or buttons may be added elsewhere in the content data or assets.

As described above, phantom buttons may be added to any actual or true menu of the assets, to a phantom menu added specifically to provide the phantom buttons or to any physical cell ostensibly representing content data which is presented before, during or after the assets of the recording data by defining the phantom buttons in the PCI packet (see FIG. 6) or to any combination of these. These phantom buttons may as described above be linked to a subversive region, for example a corrupt or subversive title or program chain that, for example, points to the correct physical cells in an incorrect or scrambled order; points to physical cells containing incorrect data; points to physical cells having subversive properties, for example containing any of the forms of subversive data discussed above, such that a ripper is, for example, forced to follow an incorrect path leading to termination of the ripping process or is caused to produce of an unwatchable or unplayable copy.

The phantom buttons may be defined to have any appearance that makes them difficult for a viewer of the DVD-video to detect and/or select. For example, as discussed above, a phantom button may be visually indistinguishable or difficult to distinguish from the image content of the video frames or frames in which it is placed. For example a phantom button may be of the same or similar colour to the background of the video frames or frames or camouflaged or otherwise visually hidden in the video frames or frames. As another possibility or additionally, a phantom button may be positioned in a place where it does not attract the viewer's attention, for example on a video frame border. As another possibility or additionally, a phantom button may occupy a very small area, for example be only one or two pixels wide. As another possibility or additionally, a phantom button may be defined so as to be displayed, whether or not within a phantom menu, for a time so short that a viewer is not able to react to it. In this latter case, preferably the button (and the phantom menu if present) may be displayed in a manner that does not attract the viewer's attention, for example the button may by virtue of its colour, size or position be difficult for a viewer to distinguish.

The phantom button has of course to point to a location of the DVD zone. Any appropriate location may be used. Generally, a phantom button will point to a subversive or corrupt location or to correct data in a scrambled or incorrect order. Normally, a phantom button will point to a corrupted title of some description, for example a title added during VTS or title cloning or saturation as discussed above and as described in U.S. application Ser. No. 11/481,605, the whole contents of which are hereby incorporated by reference.

The term button is used herein to refer to any visual object intended to be displayed to a viewer and that is associated with control data that causes a player to carry out an action defined or associated with the control data in the event the viewer selects that button using their remote or user input device (such as a keyboard or pointing device such as a mouse). The button does not necessarily have to have a normal button shape, for example the button need not necessarily be rectangular.

The copy protector may be capable of carrying out any of the methods described above of providing a phantom button or phantom buttons or a phantom menu with a phantom button or phantom buttons. Where the copy protector is capable of carrying out more than one of these methods, any, all or a selected one of these methods may be used for a single DVD-video.

As shown in FIG. 1, the producing apparatus 1 has both authoring functionality (asset receiver 5, asset encoder 6 and authorer 7) and a file receiver 91. Where appropriate the apparatus may include only one of these, that is either the authoring functionality or the file receiver 91.

As mentioned above, the copy protector functionality may be provided within the authorer so that the copy protection does not form a separate step but is carried out as part of the authoring process.

In the above-described embodiments, the recording medium is a DVD or a precursor such as a glass master or stamping master. The recording medium may be another form of optical disc (or a precursor thereof) or other recording medium from which content data that can be accessed in a non-sequential manner using navigational data stored by the recording medium. Thus, it will, of course, be appreciated that the present invention may be applied to other forms of digital recording media such as, for example, magnetic or magneto-optical recording discs. In addition, as described above, the recording medium is a disc that is read by spinning or rotating the disc about a central axis. It may, however, also be possible to apply the present invention to digital recording media in the form of Digital Linear Tape which is transported along a path past, rather than rotated with respect to, a read/write head.

What is claimed is:

1. Apparatus for providing recording data to be recorded onto a recording medium, the apparatus comprising a processor and an associated storage medium storing instructions executed by the processor, the instructions comprising:
   providing recording data having content data comprising video data and navigation data to enable a player of the recording medium to navigate through the content data, the recording data comprising button data defining one or more user-selectable selection buttons to be presented to a viewer to enable the viewer to select content data to be played by the player; and
   providing the recording data with further button data defining at least one phantom button that is not intended for access by a viewer but is identified as a selection button by a copying apparatus; wherein the instructions associate the at least one phantom button with a subversive region of the recording medium which inhibits copying of the recording medium or adversely affects the quality or playability of a copy.

2. Apparatus according to claim 1, wherein the at least one phantom button is not recognized as a selection button by a viewer when the recording medium is played by a player.

3. Apparatus according to claim 1, wherein the at least one phantom button is not recognized as a selection button by a viewer when the recording medium is played by a player.

4. Apparatus according to claim 1, wherein the subversive region includes at least one:
   scrambled or unreadable data;
   incorrect data;
   data that includes non-correctable errors;
   a damaged area of the recording medium.

5. Apparatus according to claim 1, wherein the at least one phantom button comprises at least one of:
   an indiscernible button;
   a button of the same colour as a background of a video frame containing the phantom button;
   a button camouflaged in the video frame or frames within which it is present;
   a button that is visible for a period of time shorter than that within which a viewer would be able to act to select the button;
   a button having at least one dimension of no more than two pixels;
   a button that extends along at least part of an edge of a video frame.

6. Apparatus according to claim 1, wherein the instructions provide the recording data with a phantom menu having the at least one phantom button.

7. Apparatus according to claim 1, wherein the instructions provide the recording data with a phantom menu having the at least one phantom button and wherein the phantom menu is displayed for about 0.4 seconds or less.

8. Apparatus according to claim 1, wherein the navigation data comprises menu data comprising the button data for the one or more user-selectable selection buttons and the processor provides the further button data for the at least one phantom button in that menu data.

9. A method of providing recording data to be recorded onto a recording medium, comprising:
   providing on a storage medium recording data having content data comprising video data and navigation data to enable a player of the recording medium to navigate through the content data, the recording data comprising button data defining one or more user-selectable selection buttons to be presented to a viewer of the recording medium to enable the viewer to select content data to be played by the player; and
   a processor coupled to the storage medium and adding to the recording data further button data defining at least one phantom button that is not intended for access by a viewer but is identified as a selection button by a copying apparatus; and
   associating the at least one phantom button with a subversive region of the recording medium which inhibits copying of the recording medium or adversely affects the quality or playability of a copy.

10. A method according to claim 9, wherein the at least one phantom button is not recognized as a selection button by a viewer when the recording medium is played by a player.

11. A method according to claim 9, wherein the subversive data is at least one of:
    scrambled or unreadable data;
    incorrect data;
    data that includes non-correctable errors;
    a damaged area of the recording medium.

12. A method according to claim 9, wherein the at least one phantom button comprises at least one of:
    an indiscernible button;
    a button of the same colour as a background of a video frame containing the phantom button;
    a button camouflaged in the video frame or frames within which it is present;
    a button that is visible for a period of time shorter than that within which a viewer would be able to act to select the button;
    a button having at least one dimension of no more than two pixels;
    a button that borders at least part of at least one video frame.

13. A method according to claim 9, which further comprises providing the recording data with a phantom menu having the at least one phantom button.

14. A method according to claim 9, which further comprises providing in the navigation data menu data comprising the button data for the one or more user-selectable selection buttons and the further button data for the at least one phantom button.

15. A method according to claim 9, further comprising at least one of: providing a recording data file comprising the recording data; producing a master carrying the recording data; producing a precursor to a master carrying the recording data; producing at least one recorded medium carrying the recording data; and writing the recording data onto an optical disc.

16. A non-transitory processor-readable storage medium storing processor instructions comprising instructions to program a processor to:

provide recording data having content data comprising video data and navigation data to enable a player of the recording medium to navigate through the content data, the navigation data comprising button data defining one or more user-selectable selection buttons to be presented to a viewer to enable the viewer to select content data to be played by the player; and to incorporate in the navigation data further button data defining at least one phantom button that will not be selected by the viewer but is identified as a selection button by a copying apparatus; and associating the phantom button with a subversive region of the recording medium which inhibits copying of the recording medium or adversely affects the quality or playability of a copy.

* * * * *